(12) United States Patent
Pfaller et al.

(10) Patent No.: US 12,084,183 B2
(45) Date of Patent: Sep. 10, 2024

(54) ROTARY WING AIRCRAFT WITH AN ASYMMETRICAL FRONT SECTION

(71) Applicant: AIRBUS HELICOPTERS DEUTSCHLAND GMBH, Donauworth (DE)

(72) Inventors: Rupert Pfaller, Riemerling (DE); Tobias Ries, Nordendorf (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 229 days.

(21) Appl. No.: 17/377,538

(22) Filed: Jul. 16, 2021

(65) Prior Publication Data

US 2022/0185466 A1 Jun. 16, 2022

(30) Foreign Application Priority Data

Dec. 14, 2020 (EP) ..................................... 20400025

(51) Int. Cl.
*B64C 39/00* (2023.01)
*B64C 1/00* (2006.01)
*B64C 27/22* (2006.01)

(52) U.S. Cl.
CPC .......... *B64C 39/029* (2020.01); *B64C 1/0009* (2013.01); *B64C 27/22* (2013.01)

(58) Field of Classification Search
CPC ...... B64C 1/0009; B64C 39/029; B64C 23/06
See application file for complete search history.

(56) References Cited

U.S. PATENT DOCUMENTS

| 2,452,355 | A | | 10/1948 | Nall | |
|---|---|---|---|---|---|
| 3,241,791 | A | | 3/1966 | Piasecki | |
| 3,432,119 | A | * | 3/1969 | Miller | B64C 27/82 244/6 |
| 3,921,938 | A | * | 11/1975 | Jupe | B64C 1/30 244/17.11 |

(Continued)

FOREIGN PATENT DOCUMENTS

| EP | 1395489 A2 | 3/2004 |
|---|---|---|
| EP | 2511177 A1 | 10/2012 |

(Continued)

OTHER PUBLICATIONS

European Search Report for European Application No. EP 20400025. 1, Completed by the European Patent Office, Dated May 12, 2021. 9 pages.

*Primary Examiner* — Joseph W Sanderson
(74) *Attorney, Agent, or Firm* — Brooks Kushman P.C.

(57) ABSTRACT

A rotary wing aircraft that extends along an associated roll axis between a nose region and an aft region and that comprises a fuselage with a front section and a rear section, wherein the rear section extends between the front section and the aft region, the rotary wing aircraft comprising: a propeller that is rotatably mounted at the rear section in the aft region, a main rotor that is rotatably mounted at the front section, and a source of asymmetry that is connected to the front section such that the front section comprises at least in sections an asymmetrical cross-sectional profile in direction of the associated roll axis, wherein the source of asymmetry is configured to generate sideward thrust for main rotor anti-torque from main rotor downwash.

10 Claims, 9 Drawing Sheets

(56) References Cited

U.S. PATENT DOCUMENTS

| | | | | |
|---|---|---|---|---|
| 4,786,009 A * | 11/1988 | Rao | ............. | B64C 23/06 244/91 |
| 4,905,932 A | 3/1990 | Piasecki | | |
| 4,928,907 A | 5/1990 | Zuck | | |
| 5,201,829 A * | 4/1993 | Peters, Jr. | ............. | B64C 21/00 244/3.21 |
| 5,209,430 A | 5/1993 | Wilson et al. | | |
| 5,249,762 A * | 10/1993 | Skow | ............. | B64C 23/06 244/199.1 |
| 5,449,131 A * | 9/1995 | Kramer | ............. | B64C 5/06 244/206 |
| 6,416,015 B1 * | 7/2002 | Carson | ............. | B64C 27/82 244/17.19 |
| 8,336,808 B2 * | 12/2012 | Challis | ............. | B64C 27/22 244/6 |
| 8,424,798 B2 * | 4/2013 | Challis | ............. | B64C 39/029 244/45 R |
| 8,727,265 B2 * | 5/2014 | Altmikus | ............. | B64C 39/008 244/17.11 |
| 8,985,503 B2 * | 3/2015 | Desroche | ............. | B64C 23/06 244/17.11 |
| 8,991,742 B2 * | 3/2015 | Alber | ............. | B64C 27/82 244/17.11 |
| 9,409,643 B2 * | 8/2016 | Mores | ............. | B64C 27/06 |
| 10,112,697 B2 * | 10/2018 | Waltner | ............. | B64C 3/42 |
| 10,279,899 B2 * | 5/2019 | Carpenter | ............. | B64C 27/82 |
| 11,447,243 B2 * | 9/2022 | Carpenter | ............. | B64C 23/06 |
| 11,655,021 B2 * | 5/2023 | Pfaller | ............. | B64C 1/0009 244/17.19 |
| 2008/0237393 A1 * | 10/2008 | Challis | ............. | B64C 27/22 244/17.21 |
| 2011/0272519 A1 | 11/2011 | Challis | | |
| 2012/0256042 A1 * | 10/2012 | Altmikus | ............. | B64C 27/82 244/17.21 |
| 2014/0008486 A1 * | 1/2014 | Alber | ............. | B64C 27/06 244/17.11 |
| 2014/0317900 A1 * | 10/2014 | Desroche | ............. | B64C 23/06 29/401.1 |
| 2015/0191245 A1 * | 7/2015 | Mores | ............. | B64C 27/06 244/17.19 |
| 2017/0001722 A1 * | 1/2017 | Carpenter | ............. | B64C 27/82 244/91 |
| 2019/0225331 A1 * | 7/2019 | Carpenter | ............. | B64C 23/06 |
| 2021/0371091 A1 * | 12/2021 | Kobayashi | ............. | B64C 27/57 |
| 2022/0185467 A1 * | 6/2022 | Pfaller | ............. | B64C 39/029 |

FOREIGN PATENT DOCUMENTS

| | | |
|---|---|---|
| EP | 2808253 A1 | 12/2014 |
| EP | 3317180 A2 | 5/2018 |
| FR | 2897040 A1 | 8/2007 |
| JP | H0733091 A | 2/1995 |
| JP | H10181694 A | 7/1998 |
| RU | 2282565 C2 | 8/2006 |
| WO | 2002087967 A2 | 11/2002 |
| WO | 2014176431 A1 | 10/2014 |
| WO | 2017027112 A2 | 2/2017 |

* cited by examiner

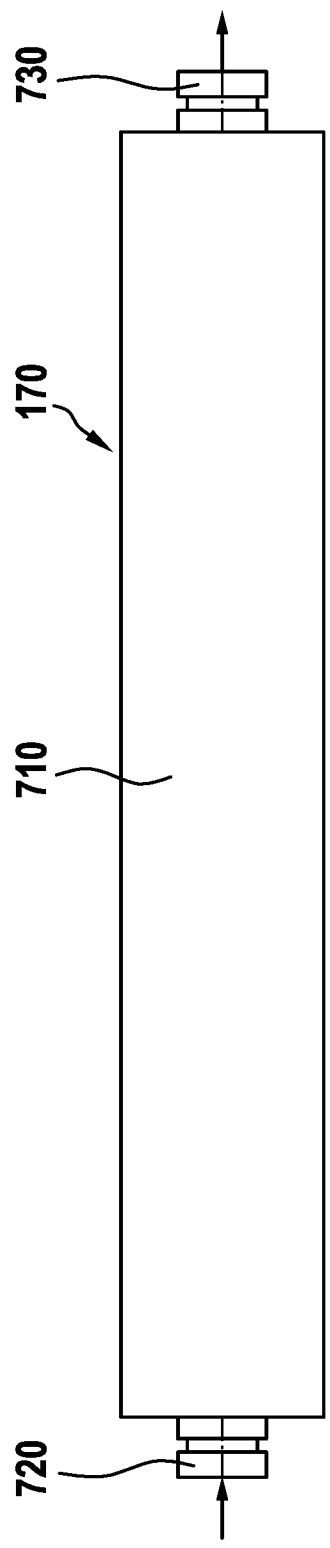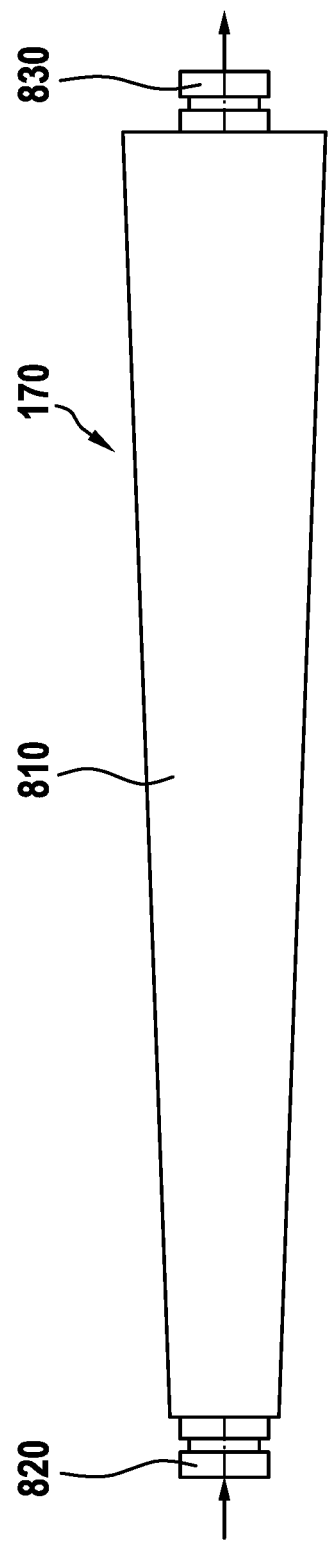

ROTARY WING AIRCRAFT WITH AN ASYMMETRICAL FRONT SECTION

CROSS-REFERENCE TO RELATED APPLICATIONS

This application claims priority to European patent application No. EP 20400025.1 filed on Dec. 14, 2020, the disclosure of which is incorporated in its entirety by reference herein.

TECHNICAL FIELD

The present disclosure relates to a rotary wing aircraft that extends along an associated roll axis between a nose region and an aft region and that comprises a fuselage with a front section and a rear section, wherein the rotary wing aircraft further comprises a main rotor that is rotatably mounted at the front section and a propeller that is rotatably mounted at the rear section in the aft region.

BACKGROUND

An example for a rotary wing aircraft with a main rotor and a propeller is a so-called compound helicopter. In such a compound helicopter, the main rotor accomplishes essentially lifting duties, but usually also accomplishes propulsive duties at least at low or medium forward speeds in forward flight of the compound helicopter. The propeller, in turn, is mainly provided to off-load the main rotor from its propulsive duties at higher forward speeds in forward flight and may enable the compound helicopter to travel with comparatively high forward speeds which would not be reachable by use of the main rotor alone.

However, in operation the main rotor creates a torque around the yaw axis of the compound helicopter. This torque must be counteracted by a suitable anti-torque device to guarantee a required yaw stability of the compound helicopter in flight operation.

The document U.S. Pat. No. 3,241,791 describes a compound helicopter with a main rotor and a tail propeller. The tail propeller is mounted to a circular shroud which is attached to the compound helicopter's fuselage. The circular shroud is further provided with a rudder that is pivotally mounted to the circular shroud downstream of the tail propeller. In operation, the tail propeller creates an air stream which is directed through the circular shroud toward the rudder and which may be deflected by the rudder to counteract the torque created by the main rotor.

The document U.S. Pat. No. 4,928,907 describes a compound helicopter with a main rotor, a tail boom, and a tail propeller mounted to an aft region of the tail boom, wherein the tail propeller is used only for forward thrust during an airplane mode of flight and during transition from vertical helicopter flight to forward airplane mode of flight, when the main rotor may be feathered in a no-lift attitude. Required anti-torque balancing forces during hovering mode are developed by differentially controlled aileron forces when respective wings are aligned vertically with main rotor downwash. Furthermore, a vertically moveable horizontal airfoil is provided on the tail boom, with controllable means which can provide anti-torque reaction forces from the main rotor downwash during the hovering mode.

The document EP 1 395 489 A2 describes a compound helicopter with a main rotor, a tail propeller, and a tail boom extending through an area of downwash from the main rotor. The tail boom forms a plenum chamber to which associated linear nozzles are connected. The associated linear nozzles are fixedly coupled to the tail boom and adapted to discharge a sheet of fluid created from pressurized air in the plenum chamber in a direction substantially tangential to an outer surface of the tail boom to divert main rotor downwash and thereby produce a force that counteracts biasing torque created by the main rotor. The pressurized air is provided by a fan or by directing exhaust air from a power plant of the compound helicopter into the plenum chamber. The compound helicopter further comprises a yaw control member which is movably coupled to the tail boom and selectively positionable based on pilot input.

The document EP 2 511 177 A1 describes a compound helicopter with a main rotor, a tail propeller, and a tail boom that is surrounded by a cycloidal rotor. The cycloidal rotor has individual blades which are essentially parallel to the longitudinal axis of the tail boom. In operation, the cycloidal rotor is driven to provide anti-torque that counteracts biasing torque created by the main rotor.

However, the above-described anti-torque devices for compound helicopters with a main rotor and a propeller are generally complex and require actuatable components, such as rudders, differentially controlled ailerons or moveable airfoils, additional fans, pilot-moveable yaw control members, or cycloidal rotors. These actuatable components increase an overall system complexity and an overall weight of these anti-torque devices.

Various other anti-torque devices are known from conventional helicopters which, in contrast to the above-described compound helicopters, are not provided with a propeller. In such conventional helicopters, wherein a respective main rotor creates torque around the helicopter's yaw axis, usually a tail rotor is provided as anti-torque device to provide anti-torque that counteracts the torque created by the respective main rotor. Moreover, as main rotor downwash of such a conventional helicopter generally flows around its tail boom, the tail boom may be provided with additional anti-torque devices in the form of strakes or vortex generators to alter the flow of downwash in order to generate a compensation force that counteracts at least partially the torque created by the respective main rotor such that a respective down-sizing of the tail rotor is enabled. Furthermore, a fairing may be added as additional anti-torque device to the tail boom of such a conventional helicopter to create the compensation force, or the profile of the tail boom as such may be modified. Other additional anti-torque devices may likewise be added to the tail boom, such as e.g., a rotating cylinder that uses the so-called Magnus effect to generate the compensation force. Illustrative conventional helicopters with main rotors, tail rotors and such additional anti-torque devices are described in the documents EP 3 317 180 A2, WO 2014/176431 A1, and U.S. Pat. No. 5,209,430 A.

If a respectively created compensation force suffices to counteract biasing torque created by the main rotor, it is also possible to omit provision of the tail rotor. Illustrative helicopters with a main rotor and an anti-torque device that enables omission of a respective tail rotor are described in the documents FR 2 897 040 A1, RU 2 282 565 C2, and U.S. Pat. No. 2,452,355 A.

Nevertheless, most of the above-described anti-torque devices of conventional helicopters are not suitable for use in a compound helicopter with a main rotor and a tail propeller as they require presence of a conventional tail rotor. However, a conventional tail rotor has usually a comparatively high power consumption, especially in hover condition, and is quite noisy. In contrast, the above-described anti-torque devices which do not need presence of a conventional tail rotor are bulky and/or require actuatable components, such as additional fans, rotatable truncated cones or rotatable cylinders. These actuatable components, however, increase an overall system complexity and an overall weight of the anti-torque devices.

SUMMARY

It is, therefore, an object of the present disclosure to provide a new compound helicopter and, more generally, a new rotary wing aircraft with a main rotor and a tail propeller, which is equipped with an improved anti-torque device that exhibits a comparatively low overall system complexity and a reduced overall weight.

This object is solved by a rotary wing aircraft with a main rotor and a tail propeller, said rotary wing aircraft comprising the features of claim 1. More specifically, according to the present disclosure a rotary wing aircraft is provided that extends along an associated roll axis between a nose region and an aft region and that comprises a fuselage with a front section and a rear section, wherein the rear section extends between the front section and the aft region. The rotary wing aircraft comprises a propeller that is rotatably mounted at the rear section in the aft region, a main rotor that is rotatably mounted at the front section, and at least one source of asymmetry that is connected to the front section such that the front section comprises at least in sections an asymmetrical cross-sectional profile in direction of the associated roll axis. The at least one source of asymmetry is configured to generate sideward thrust for main rotor anti-torque from main rotor downwash.

Advantageously, by forming the front section of the fuselage asymmetrically with the at least one source of asymmetry that is configured to generate sideward thrust for main rotor anti-torque from main rotor downwash, a passive anti-torque device may be provided which does not require any actuator, thereby avoiding the weight and the need for redundancy of an active system. Accordingly, a reduced overall system complexity of the inventive passive anti-torque device may be obtained and, consequently, a required maintenance effort for the anti-torque device will be comparatively low.

More specifically, in order to enable use of the at least one source of asymmetry for generation of sideward thrust for main rotor anti-torque from main rotor downwash, the at least one source of asymmetry is preferably located to a side of the rotary wing aircraft that is closest to an approaching rotor blade of the main rotor in the sense of rotation of the main rotor. In other words, if the main rotor rotates in counterclockwise direction, the at least one source of asymmetry is located at the starboard side, i.e., the right-hand side of the fuselage of the rotary wing aircraft, which is preferably formed as a compound helicopter with the main rotor and the propeller.

By way of example, the at least one source of asymmetry may be formed as a protruding edge of the fuselage that may be arranged close to a lower side of the fuselage. Such a protruding edge may be formed sufficiently large in order to be usable as a step. Furthermore, it may e.g., be integrated into an aerodynamically shaped skid landing gear. Alternatively, such a protruding edge may be built by a cover of a retractable nose landing gear. In this case, an aerodynamic performance of the compound helicopter in fast forward flight will not be affected by the protruding edge, as it will be retracted into the fuselage together with the retractable nose landing gear such that the overall configuration is aerodynamically clean again. In fact, generation of a respective anti-torque using the protruding edge is mainly necessary in hover condition and slow forward flight.

The at least one source of asymmetry may further include an elongation, i.e., a convex projection on top of the fuselage of the compound helicopter, i.e., at an upper side of the fuselage. A suitable elongation may e.g., be obtained by an appropriate shaping of an upper cowling that covers an upper deck of the compound helicopter. A highest point of the upper cowling may be shifted to an opposite side of the fuselage such that there is a smooth transition, at least with tangent constancy in the upper area of the cross section.

Moreover, in order to further increase generation of sideward thrust for main rotor anti-torque from main rotor downwash, the rear section of the fuselage of the compound helicopter may exhibit a shape that is similar to a profile of a so-called high lift airfoil, such that comparatively high sideward thrust may already be generated at comparatively low downwash air speed. Preferably, at least the main part of the rear section of the fuselage is asymmetrically located to a side of the compound helicopter that is farther away from an approaching rotor blade of the main rotor in the sense of rotation of the main rotor. In other words, if the main rotor rotates in counterclockwise direction, the main part of the rear section of the fuselage is located at the starboard side of the compound helicopter.

Preferably, a vertical cut through the rear section of the fuselage at a position that is close to the aft region of the compound helicopter resembles to a high lift airfoil. This high lift airfoil is orientated at that position preferably at least approximately in vertical direction providing "lift", i.e., sideward thrust in the same direction in which the main rotor is rotating. In other words, if the main rotor rotates in counterclockwise direction, the sideward thrust likewise points into this direction.

Thus, less power is needed in hover condition as generation of downward drag in response to main rotor downwash is reduced due to a transformation of the main rotor downwash into sideward thrust, compared to the downward drag that is created by a conventional tail boom in response to main rotor downwash. Consequently, a gain of lifting capacity and fuel savings may be realized.

Advantageously, a transition in the region of the main rotor, preferably in a region between the main rotor and the rear section of the fuselage, from a cross-sectional profile of the compound helicopter's fuselage, which may be symmetrical similar to a cross-sectional profile of a conventional helicopter, to the high lift airfoil-shaped cross-sectional profile of the rear section of the fuselage may be embodied as a smooth recess. The latter is preferably shaped in order to avoid airflow separation.

In an illustrative realization, the rear section may be provided in the aft region with a shrouded duct or a stabilizer arrangement, to which the propeller is rotatably mounted. An underlying transition of the rear section of the fuselage to the shrouded duct or the stabilizer arrangement is preferably smooth, such that the rear section of the fuselage has at least approximately a shaping that corresponds to one quarter of the shrouded duct or a respective perimeter of the stabilizer arrangement.

Furthermore, at least one wing-type aerodynamic device, which is also referred to as the "support wing" hereinafter, may be associated with the rear section of the fuselage for additional generation of sideward thrust for main rotor anti-torque from main rotor downwash. In operation of the compound helicopter, a certain amount of main rotor downwash is present mainly in hover condition. Therefore, "lift"

in horizontal direction, i.e., sideward thrust, may advantageously be generated simultaneously by the rear section of the fuselage, the associated support wing, as well as the front section, from the main rotor downwash in order to counteract the torque created by the main rotor in the hover condition.

Preferably, the support wing is mainly oriented vertically. More specifically, the support wing may connect the compound helicopter's upper deck to the shrouded duct or the stabilizer arrangement, e.g., from slightly behind of the main rotor to the shrouded duct or the stabilizer arrangement. Advantageously, the support wing also exhibits a shape that is similar to a profile of a high lift airfoil. Preferably, the support wing has its greatest width at an area located between 60% of the length of the main rotor's rotor blades and an outer end of the rotor blades.

Advantageously, the support wing and the rear section of the fuselage support the shrouded duct or the stabilizer arrangement on both sides of the compound helicopter, as there is no center part of the rear section of the fuselage, compared to a conventional tail boom. Preferably, a tail propeller drive shaft is arranged between the support wing and the rear section of the fuselage. This tail propeller drive shaft may also generate sideward thrust via the so-called Magnus effect, which occurs if a cylinder or cone is rotated in an airflow that is oriented perpendicular to its rotation axis.

The tail propeller drive shaft is preferably rotatably mounted to the shrouded duct or the stabilizer arrangement, preferentially via a bearing that is supported by a predetermined number of provided stator profiles, such as e.g., three stator profiles. Preferably the stator profiles are mounted to the shrouded duct or the stabilizer arrangement close to a respective location of the support wing and upper and lower edges of the rear section of the fuselage, where it is connected to the shrouded duct or the stabilizer arrangement.

Alternatively, instead of providing a tail propeller drive shaft, the tail propeller may be powered independent of the main rotor, e.g., by means of a separate engine. This separate engine may be of a different type than a respective main engine that powers the main rotor such that engine hybridization is enabled with high redundancy, as the compound helicopter may be operated in forward flight with each one of the engines independent of the other one.

According to one aspect, the at least one source of asymmetry comprises a plate-shaped protrusion of the fuselage.

According to one aspect, the plate-shaped protrusion forms an accessible step.

According to one aspect, the plate-shaped protrusion is integrally formed with the fuselage.

According to one aspect, the at least one source of asymmetry comprises an asymmetrically shaped upper deck of the rotary wing aircraft, wherein the asymmetrically shaped upper deck comprises an asymmetrically shaped upper starboard side wall extension.

According to one aspect, the at least one source of asymmetry comprises an asymmetrically shaped upper deck cowling of the rotary wing aircraft.

According to one aspect, the rotary wing aircraft further comprises a retractable nose landing gear with a pivotable cover, wherein the at least one source of asymmetry comprises the pivotable cover in opened state.

According to one aspect, the at least one source of asymmetry is arranged in the nose region.

According to one aspect, the at least one source of asymmetry is pivotable and/or retractable.

According to one aspect, the at least one source of asymmetry comprises a deflectable flap.

According to one aspect, the rear section comprises an asymmetrical cross-sectional profile in direction of the associated roll axis.

According to one aspect, the rear section comprises at least one airfoil-shaped aerodynamic device that extends from the front section to the aft region, wherein the at least one airfoil-shaped aerodynamic device is configured to generate sideward thrust for main rotor anti-torque from main rotor downwash.

According to one aspect, the rotary wing aircraft further comprises an uncovered propeller drive shaft, in particular a cylinder shaft or a conical shaft, that is configured to create a Magnus effect upon rotation in main rotor downwash.

By using an uncovered propeller drive shaft, provision of a respective drive shaft cowling may be omitted. Thus, an overall weight and respective costs of the compound helicopter may advantageously be reduced. Preferably, the uncovered tail propeller shaft is inclined and may have an offset to the roll axis of the compound helicopter seen from above.

In an alternative realization, the propeller and the main rotor are powered by separate engines. These separate engines may be of different types. Thus, provision of the uncovered propeller drive shaft may be omitted and engine hybridization is enabled with high redundancy, as the rotary wing aircraft may be operated in forward flight with each one of the separate engines independent of the other one.

According to one aspect, the uncovered propeller drive shaft extends coupling- and bearing-free between the front section and the propeller.

According to one aspect, the rotary wing aircraft is embodied as a compound helicopter, wherein the front section of the fuselage forms a cabin for passengers and/or cargo, wherein the propeller is a pusher propeller, and wherein the main rotor forms a single rotor plane.

Thus, an improved compound helicopter with a reduced total number of constituting components and a reduced overall system complexity may be provided. This improved compound helicopter is embodied for an efficient cruise flight and enables higher flight speeds than usually achievable with conventional compound helicopters.

BRIEF DESCRIPTION OF THE DRAWINGS

Preferred embodiments of the disclosure are outlined by way of example in the following description with reference to the attached drawings. In these attached drawings, identical or identically functioning components and elements are labeled with identical reference numbers and characters and are, consequently, only described once in the following description.

FIG. 7 shows a side view of a propeller drive shaft of the rotary wing aircraft of FIG. 1 to FIG. 4 according to one aspect, FIG. 8 shows a side view of a propeller drive shaft of the rotary wing aircraft of FIG. 1 to FIG. 4 according to another aspect.

DETAILED DESCRIPTION

Figure 1:
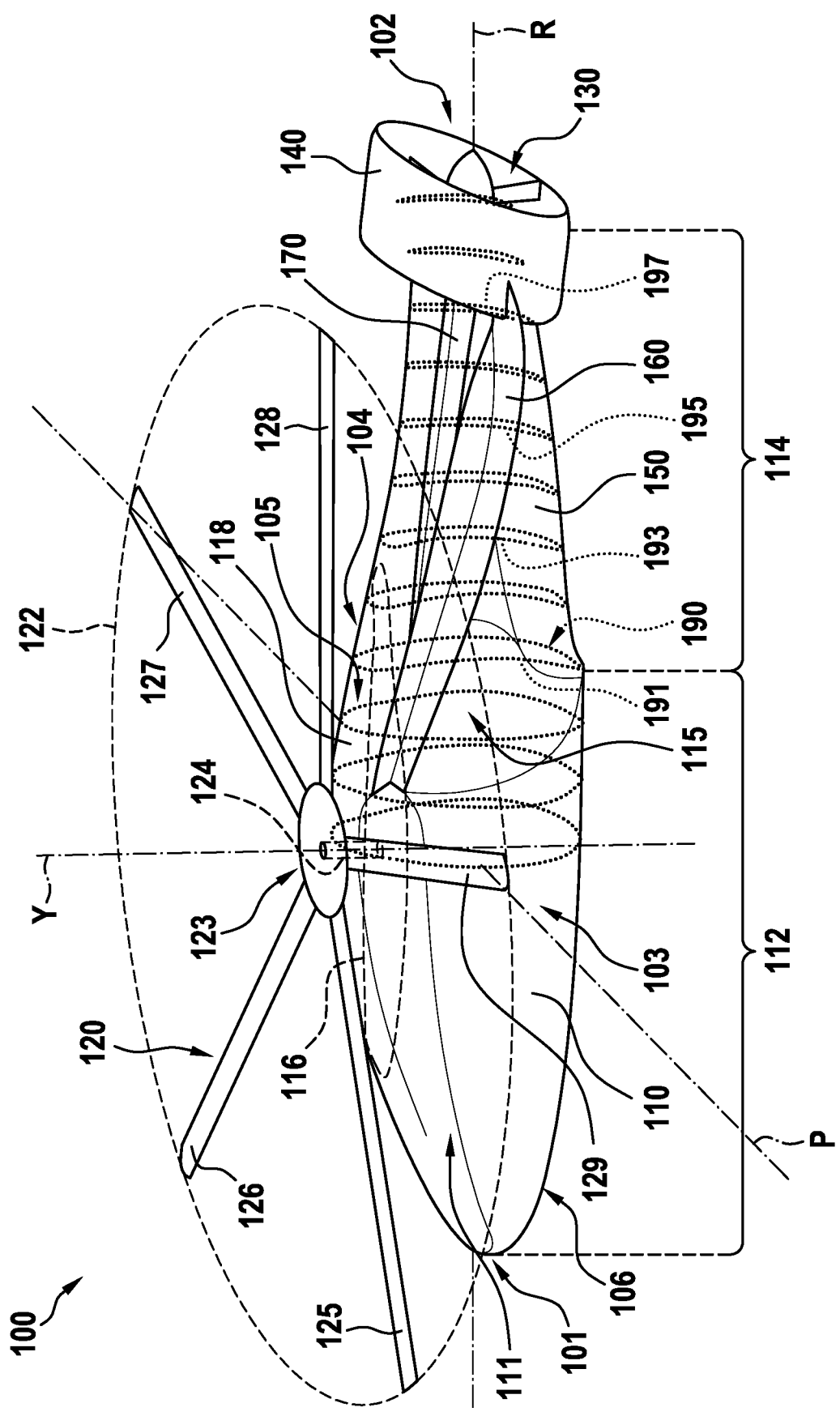
FIG. 1 shows a perspective view of a rotary wing aircraft with a fuselage according to the present disclosure.

FIG. 1 shows an illustrative rotary wing aircraft 100 with a fuselage 110 and a main rotor 120. By way of example, the rotary wing aircraft 100 is shown with three mutually orthogonal axes P, R, and Y. The axis P represents a transversal axis that corresponds to the pitch axis inherent to the rotary wing aircraft 100, the axis R represents a longitudinal axis that corresponds to the roll axis inherent to the rotary wing aircraft 100, and the axis Y represents a vertical axis that corresponds to the yaw axis inherent to the rotary wing aircraft 100.

By way of example, the rotary wing aircraft 100 is illustrated in forward flight. Thus, only components that are required for forward flight and that are related to the present disclosure are illustrated in more detail, while illustration of other components is omitted, for simplicity and clarity of the drawing. For instance, neither the fuselage 110 is illustrated in greater detail for showing e.g., respective doors and windows, nor a possible landing gear, which may be a wheel-type landing gear or a skid-type landing gear mounted to the fuselage 110, is shown, and so on.

Illustratively, the fuselage 110 extends along the roll axis R from a nose region 101 to an aft region 102 of the rotary wing aircraft 100. The fuselage 110 comprises a front section 112 and a rear section 114. Illustratively, the front section 112 comprises a port side wall 103 and a starboard side wall 104. Preferably, the rear section 114 extends in prolongation to one of the port side wall 103 or the starboard side wall 104.

More specifically, the rear section 114 preferably extends in prolongation to a side of the fuselage 110 that is farther away from an approaching rotor blade of the main rotor 120 in the sense of rotation of the main rotor 120. Assuming that the main rotor 120 rotates in counterclockwise direction, the rear section 114 of the fuselage 110 would be located at the starboard side of the compound helicopter 100 and, thus, be arranged in prolongation to the starboard side wall 104 as illustrated.

By way of example, the front section 112 merges into the rear section 114 at an associated transition or recess area 115. In other words, starting at the nose region 101 of the fuselage 110 and travelling along the roll axis R, the fuselage 110 has the front section 112 that merges at the transition or recess area 115 into the rear section 114 that, in turn, terminates in the aft region 102.

The front section 112 preferably forms a cabin 111 for passengers and/or cargo. The cabin 111 and, more generally, the fuselage 110 illustratively extends in direction of the yaw axis Y from a lower side 106 to an upper limit 116 that separates the cabin 111 from an upper deck 105. The upper deck 105 is preferably covered by a cowling 118. By way of example, the cowling 118 may cover one or more suitable engines and a main gear box that rotates the main rotor 120 in operation. Accordingly, the main rotor 120 is rotatably mounted at the front section 112 of the fuselage 110.

Preferably, the main rotor 120 forms a single rotor plane 122 and is adapted to provide lift and forward or backward thrust during operation. Illustratively, the main rotor 120 is embodied as a multi-blade main rotor with a plurality of rotor blades 125, 126, 127, 128, 129 which are coupled at an associated rotor head 123 to a rotor mast 124, which rotates in operation of the rotary wing aircraft 100 around an associated rotor axis.

According to one aspect, the rotary wing aircraft 100 is embodied as a compound helicopter with a propeller 130 that is at least adapted for generating forward thrust in operation. Accordingly, the rotary wing aircraft 100 is referred to hereinafter as the "compound helicopter 100", for simplicity and clarity.

The propeller 130 and the main rotor 120 may be driven completely independent from each other. In particular, different types of engines may be used to drive the propeller 130 and the main rotor 120, such as e.g., an air breathing propulsion engine for the main rotor 120 and an electric motor for the propeller 130.

Preferably, the propeller 130 is rotatably mounted at the rear section 114 in the aft region 102. By way of example, the propeller 130 is rotatably mounted to a shrouded duct 140. Illustratively, the shrouded duct 140 is mounted to the rear section 114 of the fuselage 110 and, more specifically, arranged in the aft region 102 of the compound helicopter 100. Accordingly, the propeller 130 forms a tail propeller and, more particularly, preferably a pusher propeller.

However, it should be noted that the shrouded duct 140 may also be omitted such that the propeller 130 would be unducted. In this case, a suitable mounting arrangement may be provided in the aft region 102 of the compound helicopter 100 for rotatably mounting the unducted propeller to the rear section 114. Alternatively, the shrouded duct 140 may e.g., be replaced by a stabilizer arrangement (1000 in FIG. 10), and so on.

The rear section 114 of the fuselage 110 illustratively extends between the front section 112 of the fuselage 110 and the shrouded duct 140. Preferably, the rear section 114 comprises an asymmetrical cross-sectional profile 190 in direction of the roll axis R of the compound helicopter 100 and is configured to generate sideward thrust for main rotor anti-torque from main rotor downwash. By way of example, the asymmetrical cross-sectional profile 190 is at least approximately C-shaped, as illustrated with a series of cross-sectional profiles 191, 193, 195, 197.

Preferably, the rear section 114 comprises at least one airfoil-shaped aerodynamic device 150 that extends from the front section 112 to the aft region 102 and, more particularly, to the shrouded duct 140. By way of example, only one airfoil-shaped aerodynamic device 150 is shown. This airfoil-shaped aerodynamic device 150 is illustratively arranged in prolongation to the starboard side wall 104.

In an illustrative realization, the airfoil-shaped aerodynamic device 150 is formed as, or by, a wing. This wing is, however, not arranged transversally to the roll axis R, but instead at least approximately in parallel to the roll axis R.

The airfoil-shaped aerodynamic device 150 may form the rear section 114, at least partly. According to one aspect, the airfoil-shaped aerodynamic device 150 is configured to generate sideward thrust for main rotor anti-torque from main rotor downwash.

In addition, the rear section 114 preferably further comprises at least one wing-type aerodynamic device 160 that extends between the front section 112 and the shrouded duct 140. By way of example, only one wing-type aerodynamic device 160 is shown. Illustratively, the wing-type aerodynamic device 160 is at least approximately arranged in prolongation to the port side wall 103.

Preferably, the wing-type aerodynamic device 160 is mounted to the shrouded duct 140 and to the upper deck 105 of the compound helicopter 100. Illustratively, the wing-type aerodynamic device 160 and the airfoil-shaped aerodynamic device 150 are connected to opposite sides of the shrouded duct 140. According to one aspect, the wing-type aerodynamic device 160 is also configured to generate sideward thrust for main rotor anti-torque from main rotor downwash of the compound helicopter 100.

Illustratively, the compound helicopter 100 further comprises an uncovered propeller drive shaft 170, in particular a cylinder shaft as described below at FIG. 7 or a conical shaft as described below at FIG. 8, that is configured to create a Magnus effect upon rotation in main rotor downwash. The uncovered propeller drive shaft 170, and likewise the shrouded duct 140, may be inclined and may have an offset to the roll axis R of the compound helicopter 100 seen from above. Preferably, the uncovered propeller drive shaft 170 is configured to drive the propeller 130 in operation and, illustratively, extends coupling- and bearing-free between the front section 112 of the fuselage 110 and the propeller 130.

According to one aspect, the front section 112 comprises at least one source of asymmetry, as described below at FIG. 4 to FIG. 6. This source of asymmetry is preferably also configured to generate sideward thrust for main rotor anti-torque from main rotor downwash of the compound helicopter 100.

Figure 2:
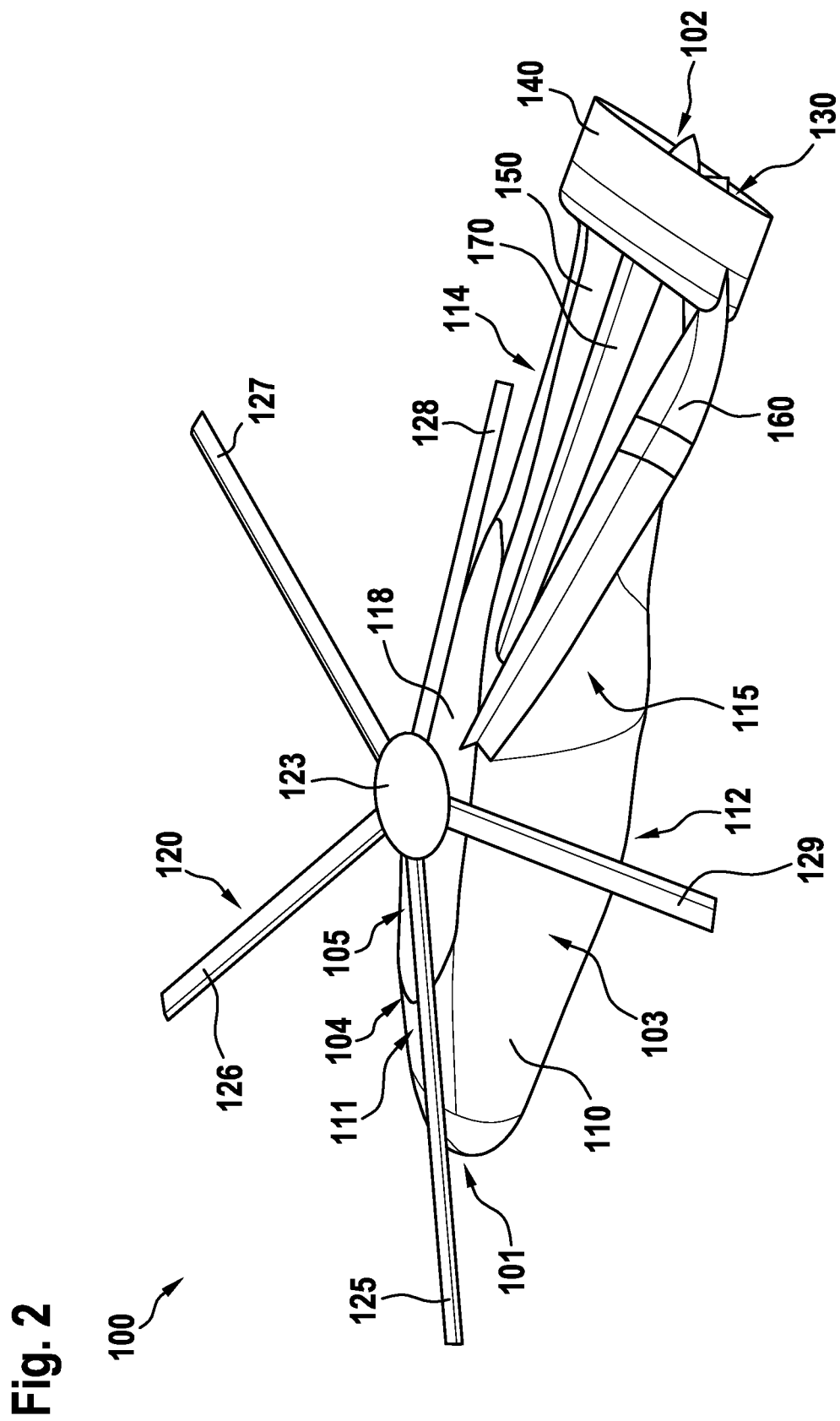
FIG. 2 shows another perspective view of the rotary wing aircraft of FIG. 1.

FIG. 2 shows the compound helicopter 100 of FIG. 1 with the fuselage 110, the main rotor 120, the propeller 130, the shrouded duct 140, and the uncovered propeller drive shaft 170. According to FIG. 1, the fuselage 110 comprises the front section 112 that merges at the recess area 115 into the rear section 114, the rear section 114 comprises the airfoil-shaped aerodynamic device 150 and the wing-type aerodynamic device 160, the propeller 130 is rotatably mounted to the shrouded duct 140 and driven by the uncovered propeller drive shaft 170, and the wing-type aerodynamic device 160 connects the upper deck 105 to the shrouded duct 140.

More particularly, FIG. 2 clarifies the coupling- and bearing-free extension of the uncovered propeller drive shaft 170 between the front section 112 of the fuselage 110 and the shrouded duct 140. In addition, merging of the front section 112 along the recess area 115 into the rear section 114 of the fuselage 110 is also further clarified and it can be recognized that the merging is essentially achieved by redirecting, i.e., deflecting the port side wall 103 of the compound helicopter 100 in the recess area 115 toward the starboard side wall 104 such that both walls 103, 104 are commonly connected to the shrouded duct's starboard side, i.e., the right-hand side of the shrouded duct 140. Moreover, the connection of the wing-type aerodynamic device 160 at the shrouded duct's port side, i.e., the left-hand side of the shrouded duct 140, which is preferably almost diametrically opposed to the connection of a respective upper edge of the airfoil-shaped aerodynamic device 150, is likewise further clarified.

Figure 3:
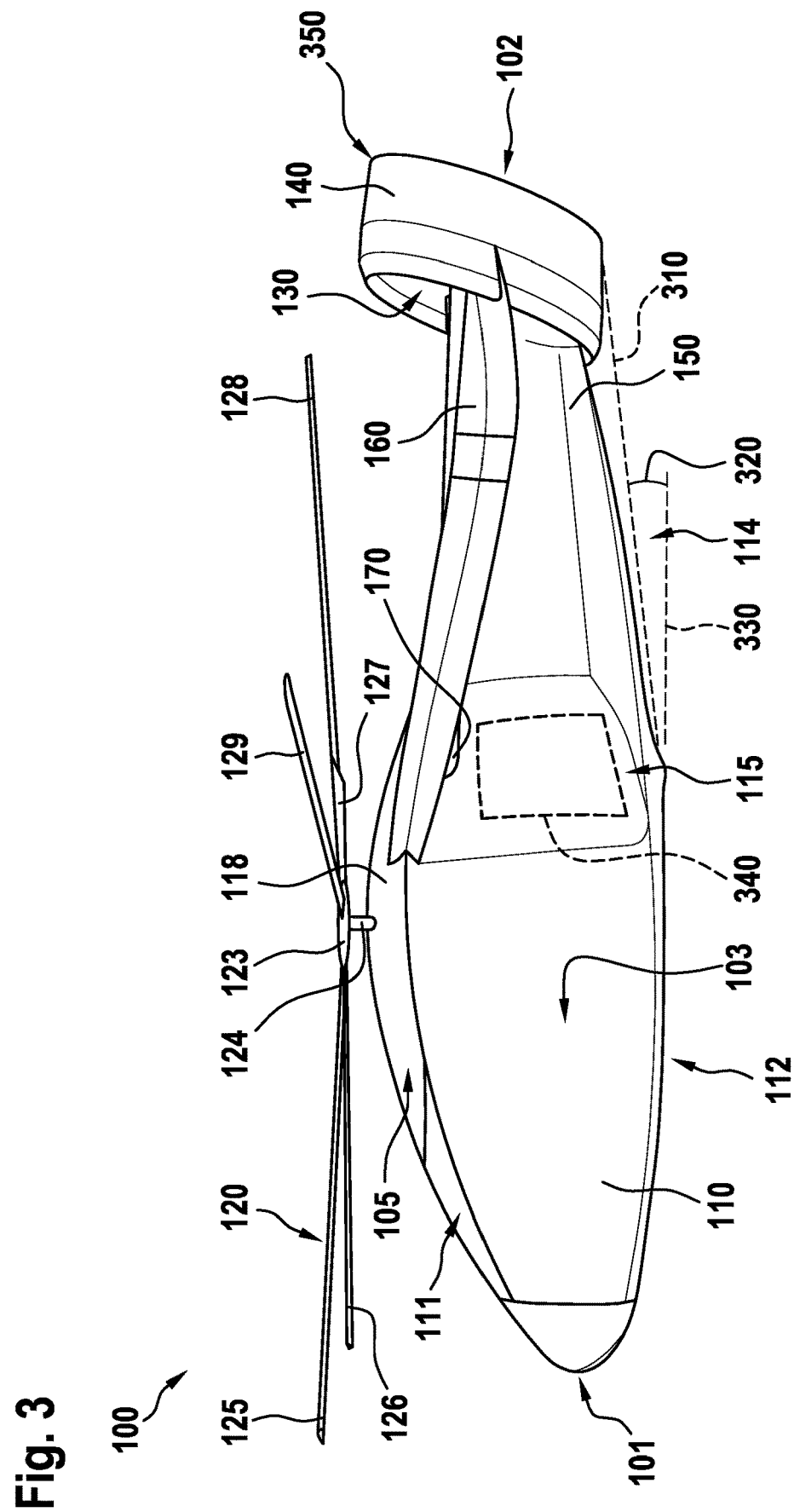
FIG. 3 shows a side view of the rotary wing aircraft of FIG. 1 and FIG. 2.

FIG. 3 shows the compound helicopter 100 of FIG. 1 with the fuselage 110, the main rotor 120, the propeller 130, the shrouded duct 140, and the uncovered propeller drive shaft 170. According to FIG. 1, the fuselage 110 comprises the front section 112 that merges at the recess area 115 into the rear section 114, the rear section 114 comprises the airfoil-shaped aerodynamic device 150 and the wing-type aerodynamic device 160, the propeller 130 is rotatably mounted to the shrouded duct 140 and driven by the uncovered propeller drive shaft 170, and the wing-type aerodynamic device 160 connects the upper deck 105 to the shrouded duct 140.

According to one aspect, the shrouded duct 140 forms a swept back structure 350. This swept back structure 350 is preferably provided to adapt main rotor downwash at the shrouded duct 140 to a preferred behavior of the compound helicopter 100 during transition from hover condition to forward flight.

Illustratively, a bottom line 310 of the rear section 114 of the fuselage 110 is shown. This bottom line 310 is preferably angled by a predetermined inclination angle 320 relative to a horizontal reference plane 330. By way of example, the predetermined inclination angle 320 is a positive (dihedral) angle that may be selected dependent on a required sideward thrust that is to be generated by the rear section 114 of the fuselage 110 in operation.

It should, nevertheless, be noted that the dihedral angle is only shown and described by way of example and not for restricting the present disclosure accordingly. Moreover, it should be noted that instead of selecting the illustrative dihedral angle e.g., a negative (anhedral) angle may likewise be selected for the predetermined inclination angle 320. In this case, an increase of up to 30% of generated sideward thrust may be obtained, resulting in a possibly achievable increase of more than 40% of a respectively generated counteracting moment.

Furthermore, according to one aspect a rear door 340 and/or additional equipment, such as e.g., a winch, may be arranged in the recess area 115. The rear door 340 may e.g., be a sliding or dual cantilever door. By way of example, the rear door 340 may be slidable into the fuselage 110, i.e., toward the cabin 111. Thus, in forward flight with opened door, there is no additional drag generated by the rear door 340.

Preferably, this rear door 340 is accessible from a rear side of the compound helicopter 100, i.e., coming from the rear section 114. Thus, the compound helicopter's cabin 111 may be loaded from the rear side. Advantageously, by positioning the rear door 340 in the recess area 115, penalties to the overall aerodynamic performance of the compound helicopter 100 due to the rear door 340 may be avoided.

Figure 4:
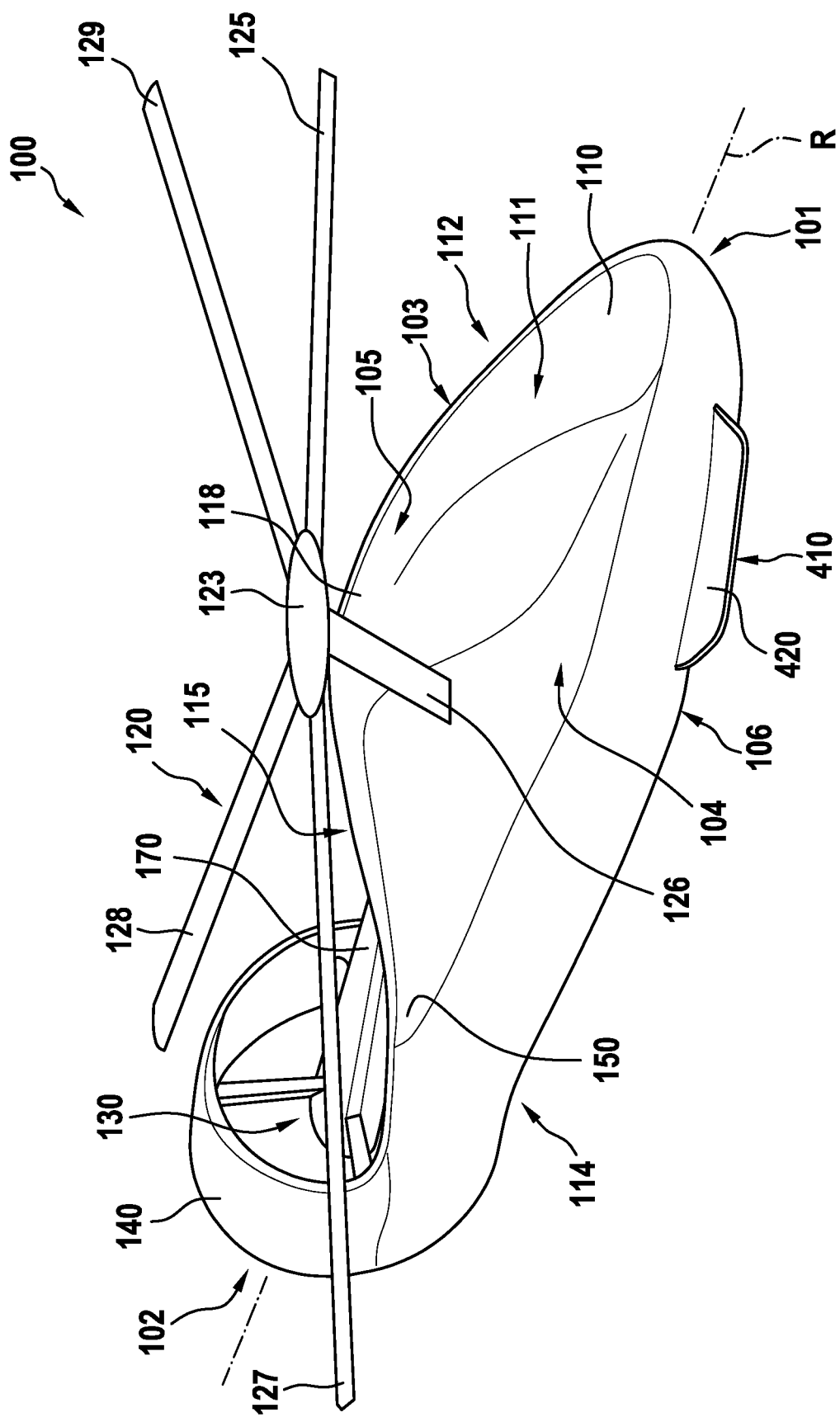
FIG. 4 shows another perspective view of the rotary wing aircraft of FIG. 1 to FIG. 3.

FIG. 4 shows the compound helicopter 100 of FIG. 1 with the fuselage 110, the main rotor 120, the propeller 130, the shrouded duct 140, and the uncovered propeller drive shaft 170. According to FIG. 1, the fuselage 110 comprises the front section 112 that merges at the recess area 115 into the rear section 114, the rear section 114 comprises the airfoil-shaped aerodynamic device 150, and the propeller 130 is rotatably mounted to the shrouded duct 140 and driven by the uncovered propeller drive shaft 170. However, illustration of the wing-type aerodynamic device 160 is omitted for simplicity and clarity of the drawing.

More particularly, FIG. 4 clarifies the connection of the airfoil-shaped aerodynamic device 150 to the shrouded duct 140. Furthermore, the merging of the front section 112 along the recess area 115 into the rear section 114 of the fuselage 110 by redirecting, i.e., deflecting the port side wall 103 of the compound helicopter 100 in the recess area 115 toward the starboard side wall 104 is also further clarified.

According to one aspect, at least one source of asymmetry 410 is connected to the front section 112, preferably close to the lower side 106 of the fuselage 110, such that the front section 112 comprises at least in sections an asymmetrical cross-sectional profile in direction of the associated roll axis R of FIG. 1. The at least one source of asymmetry 410 is preferably configured to generate sideward thrust for main rotor anti-torque from main rotor downwash, as described in more detail at FIG. 5.

The at least one source of asymmetry 410 may be formed as an integral part of the fuselage 110. According to one aspect, the at least one source of asymmetry 410 is embodied as an integrally formed protruding edge of the fuselage 110. Alternatively, the at least one source of asymmetry 410 may be pivotable and/or retractable, e.g., retractable into the fuselage 110.

By way of example, the protruding edge is formed as a plate-shaped protrusion 420 of the fuselage 110. The plate-shaped protrusion 420 is illustratively integrally formed with the fuselage 110. According to one aspect, the plate-shaped protrusion 420 forms an accessible step, e.g., a step that is suitable to support passenger access into the cabin 111 of the compound helicopter 100.

Figure 5:
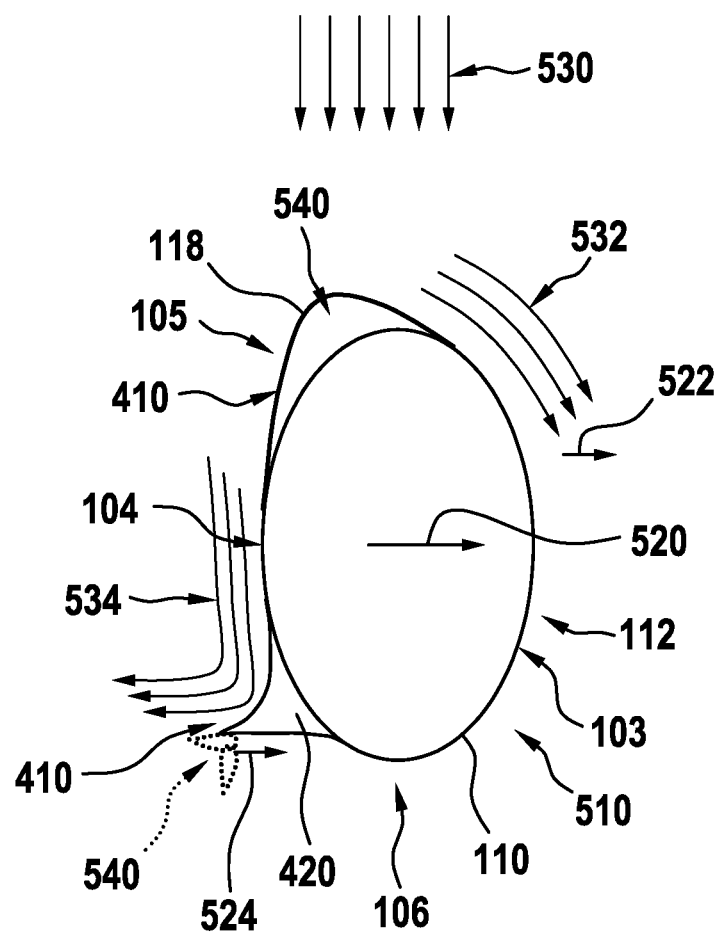
FIG. 5 shows a functional diagram of a front section of the fuselage the rotary wing aircraft of FIG. 1 to FIG. 4 with a first type of source of asymmetry.

FIG. 5 shows a simplified cross-sectional profile 510 of the compound helicopter 100 of FIG. 4 and, more particularly, of the front section 112 of the fuselage 110 of the compound helicopter 100, which comprises the at least one source of asymmetry 410. According to FIG. 4, the fuselage 110 comprises the port side wall 103 and the starboard side wall 104, as well as the lower side 106. On top of the fuselage 110 is the upper deck 105 that is illustratively covered by the cowling 118. The at least one source of asymmetry 410 comprises the plate-shaped protrusion 420 that is arranged close to the lower side 106 of the fuselage 110.

According to one aspect, the at least one source of asymmetry 410 may further, or alternatively, be formed by an asymmetric shaping of the upper deck 105. More specifically, the upper deck 105 may comprise an asymmetrically shaped upper starboard side wall extension 540. By way of example, the asymmetrically shaped upper starboard side wall extension 540 is formed by an asymmetric shaping of the cowling 118 and, more particularly, by an asymmetric arrangement of the cowling 118 on the upper deck 105.

It should be noted that the upper starboard side wall extension 540 is provided assuming that the main rotor 120 of the compound helicopter 100 of FIG. 4 rotates in counterclockwise direction. If, however, the main rotor 120 rotates in clockwise direction, then an upper port side wall extension should be provided instead.

In operation, the front section 112 of the fuselage 110 is subject to main rotor downwash 530 of the main rotor 120 of FIG. 4. The main rotor downwash 530 is illustratively deviated by the asymmetrically shaped upper starboard side wall extension 540, as illustrated with arrows 532, such that sideward thrust 522 is generated by means of suction. Similarly, the plate-shaped protrusion 420 deviates the main rotor downwash 530, as illustrated with arrows 534, such that sideward thrust 524 is generated by means of compression. The generated sideward thrust 522 and the generated sideward thrust 524 form together a total sideward thrust 520 generated by the at least one source of asymmetry 410 for main rotor anti-torque.

It should be noted that, in order to enable adjustment of the magnitude of the sideward thrust 524, the plate-shaped protrusion 420 may be equipped with a deflectable flap 545. The deflectable flap 545 may be actuatable, e.g., in response to pilot input.

Figure 6:
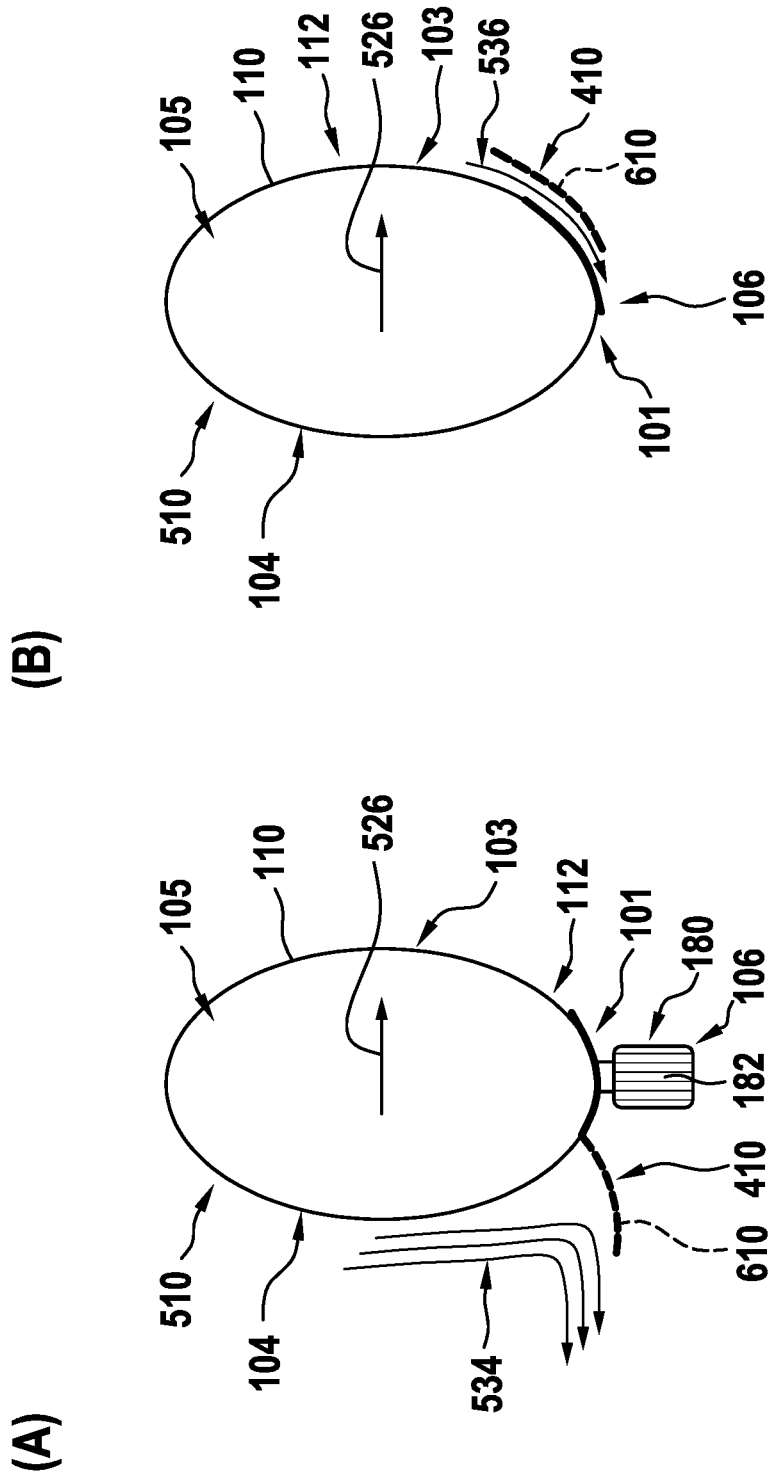
FIG. 6 shows a functional diagram of the front section of the fuselage the rotary wing aircraft of FIG. 1 to FIG. 4 with a second type of source of asymmetry.

FIG. 6 shows the simplified cross-sectional profile 510 of FIG. 5 of the compound helicopter 100 of FIG. 4 and, more particularly, of the nose region 101 of the front section 112 of the fuselage 110 of the compound helicopter 100, which comprises the at least one source of asymmetry 410. According to FIG. 4, the fuselage 110 comprises the port side wall 103 and the starboard side wall 104, as well as the lower side 106. On top of the fuselage 110 is the upper deck 105. However, in contrast to FIG. 5 illustration of the cowling 118 is omitted for simplicity of the drawing.

According to one aspect, the at least one source of asymmetry 410 is arranged in the nose region 101 and comprises now by way of example a pivotable cover 610 in opened state. The pivotable cover 610 is illustratively arranged on the lower side 106 of the fuselage 110.

As illustrated in part (A) of FIG. 6, the pivotable cover 610 is preferably associated with a retractable nose landing gear 180. By way of example, the retractable nose landing gear 180 is of the wheel type and, thus, comprises one or more wheels 182.

Preferably, the pivotable cover 610 is pivotable toward a side of the compound helicopter 100 of FIG. 4 that is closest to an approaching rotor blade of the main rotor 120 of FIG. 4 in the sense of rotation of the main rotor 120. In other words, if the main rotor 120 rotates in counterclockwise direction, the pivotable cover 610 is pivotable toward the starboard side wall 104, i.e., the right-hand side of the fuselage 110. Accordingly, the pivotable cover 610 in its opened state protrudes from the lower side 106 of the fuselage 110 illustratively away from the starboard side wall 104 and may, thus, act similar to the plate-shaped protrusion 420 of FIG. 5 and deviate main rotor downwash as illustrated with the arrows 534 of FIG. 5, such that sideward thrust 526 is generated.

In part (B) of FIG. 6, the retractable nose landing gear 180 of part (A) is omitted, for simplicity. In contrast to part (A), part (B) shows an illustrative realization in which the pivotable cover 610 in its opened state is essentially arranged in parallel to the port side wall 103 and may, thus, deviate main rotor downwash as illustrated with arrows 536 to generate the sideward thrust 526. Again, the described arrangement of the pivotable cover 610 assumes counter-clockwise rotation of the main rotor 120 of the compound helicopter 100 of FIG. 4. In the case of clockwise rotation, the pivotable cover 610 in its opened state would essentially be arranged in parallel to the starboard side wall 104 instead.

At this point, it should be noted that the pivotable cover 610 may not generate the sideward thrust 526 in closed state. However, the sideward thrust 526 is usually mainly required for main rotor anti-torque in hover condition and slow forward flight of the compound helicopter 100 of FIG. 1 to FIG. 4. The pivotable cover 610 will, nevertheless, mainly be in opened state in the hover condition and may be in opened state in slow forward flight, but will essentially be in the closed state during normal or fast forward flight of the compound helicopter 100. In other words, the pivotable cover 610 will be in opened state when generation of the sideward thrust 526 is required, and in closed state otherwise.

FIG. 7 shows the uncovered propeller drive shaft 170 of FIG. 1 to FIG. 4 which, according to one aspect, comprises a big diameter cylinder shaft 710. This big diameter cylinder shaft 710 has preferably a diameter comprised in a range from 5 to 10 times the diameter of a conventional tail rotor drive shaft. Preferably, the big diameter cylinder shaft 710 enables creation of the so-called Magnus effect for generating additional sideward thrust in operation from main rotor downwash of the main rotor 120 of the compound helicopter 100 of FIG. 1 to FIG. 4.

As described above at FIG. 1, the uncovered propeller drive shaft 170 and, thus, the big diameter cylinder shaft 710 preferably extends coupling- and bearing-free between the front section 112 of the fuselage 110 and the propeller 130. For purposes of illustration, the big diameter cylinder shaft 710 is, therefore, shown with two suitable bearings 720, 730 at its axial ends, which are provided to rotatably support the big diameter cylinder shaft 710.

In order to enable the coupling- and bearing-free extension of the big diameter cylinder shaft 710 between the front section 112 of the fuselage 110 and the propeller 130, the big diameter cylinder shaft 710 must be sufficiently stiff for a reliable and secure functioning. This may be achieved by forming the big diameter cylinder shaft 710 using carbon composites, especially high modulus fiber.

FIG. 8 shows the uncovered propeller drive shaft 170 of FIG. 1 to FIG. 4 which, according to another aspect, comprises a big diameter conical shaft 810. This big diameter conical shaft 810 has preferably a largest diameter comprised in a range from 5 to 10 times the diameter of a conventional tail rotor drive shaft. Preferably, the big diameter conical shaft 810 also enables creation of the so-called Magnus effect for generating additional sideward thrust in operation from main rotor downwash of the main rotor 120 of the compound helicopter 100 of FIG. 1 to FIG. 4.

As described above at FIG. 1, the uncovered propeller drive shaft 170 and, thus, the big diameter conical shaft 810 preferably extends coupling- and bearing-free between the front section 112 of the fuselage 110 and the propeller 130. For purposes of illustration, the big diameter conical shaft 810 is, therefore, shown with two suitable bearings 820, 830 at its axial ends, which are provided to rotatably support the big diameter conical shaft 810. Preferably, the bearing 820 supports the big diameter conical shaft 810 at the propeller 130 of FIG. 1.

In order to enable the coupling- and bearing-free extension of the big diameter conical shaft 810 between the front section 112 of the fuselage 110 and the propeller 130, the big diameter conical shaft 810 must be sufficiently stiff for a reliable and secure functioning. This may be achieved by forming the big diameter conical shaft 810 using carbon composites, especially high modulus fiber.

Figure 9:
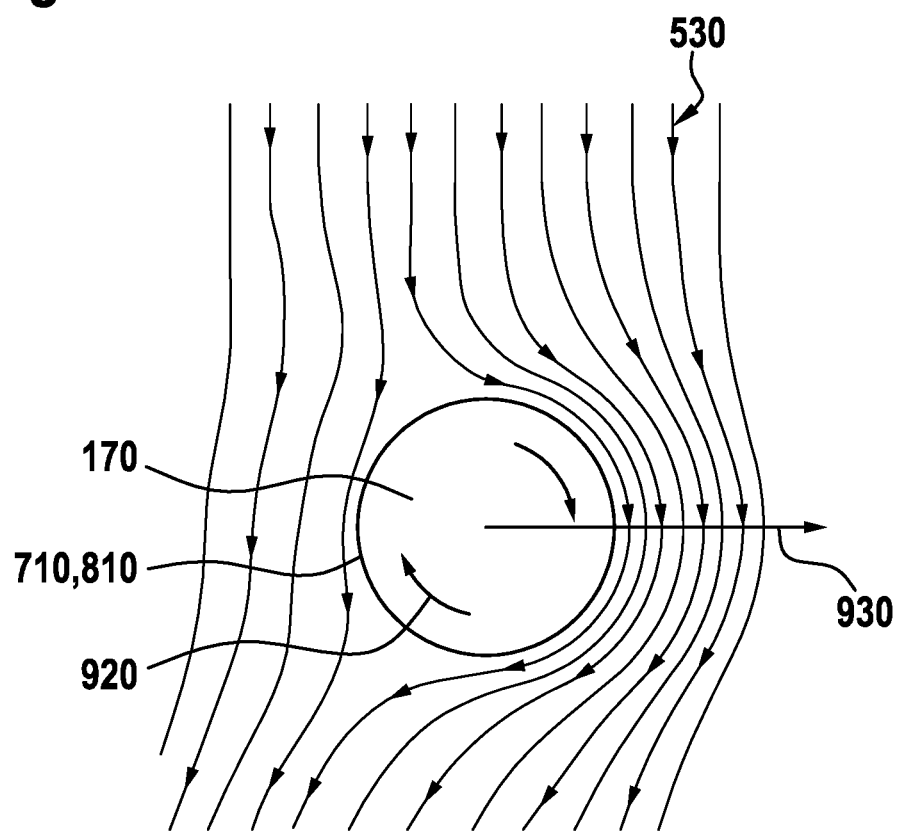
FIG. 9 shows a functional diagram of the propeller drive shaft of FIG. 7 and FIG. 8.

FIG. 9 shows the uncovered propeller drive shaft 170 of FIG. 1 to FIG. 4, which either comprises the big diameter cylinder shaft 710 of FIG. 7 or the big diameter conical shaft 810 of FIG. 8. In an illustrative operation of the main rotor 120 of the compound helicopter 100 of FIG. 1 to FIG. 4, the uncovered propeller drive shaft 170 is rotated in the main rotor downwash (530 in FIG. 5) in a rotation direction 920. Thus, as a result of the Magnus effect, the uncovered propeller drive shaft 170 generates a sideward force 930. This sideward force 930, in turn, results in sideward thrust applied to the rear section 114 of the fuselage 110 of the compound helicopter 100 of FIG. 1 to FIG. 4.

It should be noted that the Magnus effect is well-known to the person skilled in the art. Therefore, for brevity and conciseness the Magnus effect and its application for generation of sideward thrust by means of the uncovered propeller drive shaft 170 is not described in more detail.

At this point, it should be noted that modifications to the above-described realizations are within the common knowledge of the person skilled in the art and, thus, also considered as being part of the present disclosure. For instance, the airfoil-shaped aerodynamic device 150 described above may be realized with one, two or more separate airfoil-shaped aerodynamic devices. Furthermore, the shrouded duct described above may at least partly be reduced in its length, i.e., have a reduced or recessed area such as a cut-out which may e.g., be arranged in a bottom part of the shrouded duct between the airfoil-shaped aerodynamic device and the wing-type aerodynamic device. In addition, or alternatively, respective leading and trailing edges of the shrouded duct described above may be moveable forward and aft in direction of the roll axis. Moreover, the wing-type aerodynamic device 160 described above may have a width that increases from the upper deck over a predetermined length of the wing-type aerodynamic device 160. More specifically, the width may start to increase at the upper deck and then increase in direction of the aft region of the compound helicopter. By way of example, the width may increase such that a maximum width value is reached at an area located between 60% of the length of the rotor blades and their outer ends. For instance, the width may increase over at least 75% of the length of the wing-type aerodynamic device 160.

Figure 10:
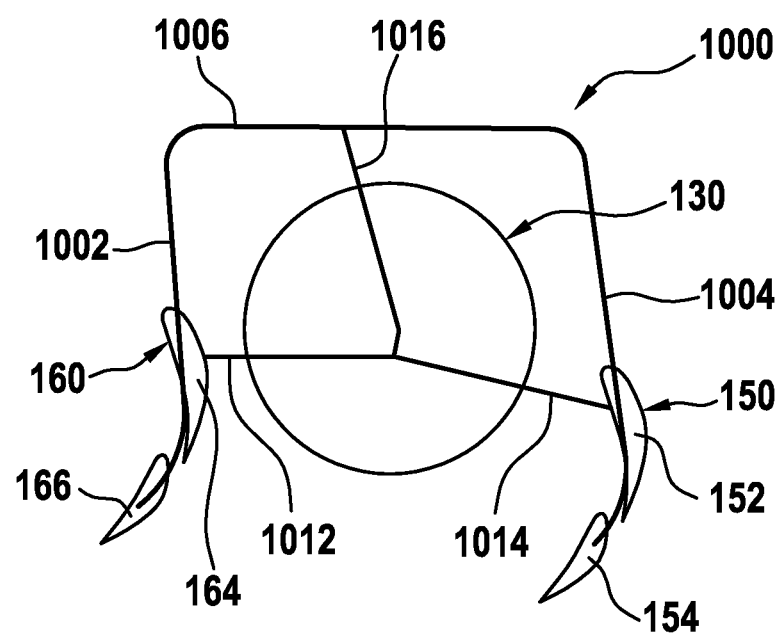
FIG. 10 shows a rear view of a modified aft region of the rotary wing aircraft of FIG. 1 to FIG. 4.

Further illustrative modifications are described below with reference to FIG. 10. FIG. 10 shows the propeller 130 and the airfoil-shaped aerodynamic device 150 as well as the wing-type aerodynamic device 160 of the compound helicopter 100 described above. However, in contrast to the configurations described above, which respectively comprise only one airfoil-shaped aerodynamic device 150, now illustratively first and second airfoil-shaped aerodynamic devices 152, 154 are provided instead. Similarly, instead of being provided with only one wing-type aerodynamic device 160, now first and second wing-type aerodynamic devices 164, 166 are provided.

Furthermore, instead of being rotatably mounted to the shrouded duct 140 as described above, the propeller 130 is now rotatably mounted to a stabilizer arrangement 1000, by way of example. More specifically, the stabilizer arrangement 1000 illustratively comprises vertical stabilizers 1002, 1004 and a horizontal stabilizer 1006, which are e.g., interconnected by means of horizontal struts 1012, 1014 and a vertical strut 1016. In this configuration, the vertical stabilizers 1002, 1004 are preferably mounted to the airfoil-shaped aerodynamic devices 152, 154 and the wing-type aerodynamic devices 164, 166, respectively. The horizontal struts 1012, 1014 and the vertical strut 1016, in turn, support the propeller 130.

REFERENCE LIST 100 rotary wing aircraft
101 aircraft nose region
102 aircraft aft region
103 port side wall
104 starboard side wall
105 aircraft upper deck
106 fuselage lower side
110 fuselage
111 cabin
112 fuselage front section
114 fuselage rear section
115 recess area
116 fuselage upper limit
118 upper deck cowling
120 main rotor
122 rotor plane
123 rotor head
124 rotor mast
125, 126, 127, 128, 129 rotor blades
130 propeller
140 shrouded duct
150 airfoil-shaped aerodynamic device
152, 154 separate airfoil-shaped aerodynamic devices
160 wing-type aerodynamic device
164, 166 separate wing-type aerodynamic devices 170 uncovered propeller drive shaft
180 retractable nose landing gear
182 wheel
190 asymmetrical cross-sectional profile of rear section
191, 193, 195, 197 asymmetrical cross-sectional profiles
310 bottom line
320 bottom line inclination angle
330 horizontal reference plane
340 aircraft rear door
350 swept back structure
410 source of asymmetry
420 plate-shaped protrusion
510 asymmetrical cross-sectional profile of front section
520, 522, 524, 526 generated sideward thrust
530 main rotor downwash
532, 534, 536 deflected main rotor downwash
540 upper starboard side wall extension
545 deflectable flap
610 pivotable cover
710 big diameter cylinder shaft
720, 730 shaft bearings
810 big diameter conical shaft
820, 830 shaft bearings
920 propeller drive shaft rotation direction
930 generated sideward force due to Magnus effect
1000 stabilizer arrangement
1002, 1004 vertical stabilizers
1006 horizontal stabilizer
1012, 1014 horizontal struts
1016 vertical strut
P aircraft pitch axis
R aircraft roll axis
Y aircraft yaw axis

What is claimed is:

1. A rotary wing aircraft that extends along an associated roll axis from a nose region to an aft region, the rotary wing aircraft comprising:
    a fuselage with a front section and a rear section, wherein the front section forms a cabin for passengers and/or cargo and comprises a port side wall and a starboard side wall, the front section extending from the nose region to a transition area and the rear section extending from the transition area to the aft region,
    a pusher propeller that is rotatably mounted to the rear section,
    a main rotor that is rotatably mounted at the front section, and
    at least one source of asymmetry that is connected in the direction of the associated roll axis between the nose region and the main rotor to the front section such that the front section comprises at least in sections an asymmetrical cross-sectional profile in the direction of the associated roll axis, wherein the at least one source of asymmetry is configured to generate sideward thrust for main rotor anti-torque from main rotor downwash, wherein the at least one source of asymmetry comprises an asymmetrically shaped upper deck of the rotary wing aircraft, wherein the asymmetrically shaped upper deck comprises an asymmetrically shaped upper starboard side wall extension, if the main rotor rotates in counterclockwise direction, for deviating main rotor downwash from the starboard side wall side toward the port side wall side of the fuselage, and wherein the asymmetrically shaped upper deck comprises an asymmetrically shaped upper port side wall extension, if the main rotor rotates in clockwise direction, for deviating main rotor downwash from the port side wall side toward the starboard side wall side of the fuselage.

2. The rotary wing aircraft of claim 1, wherein the at least one source of asymmetry comprises a plate-shaped protrusion of the fuselage.

3. The rotary wing aircraft of claim 2, wherein the plate-shaped protrusion forms an accessible step.

4. The rotary wing aircraft of claim 2, wherein the plate-shaped protrusion is integrally formed with the fuselage.

5. The rotary wing aircraft of claim 1, wherein the at least one source of asymmetry comprises an asymmetrically shaped upper deck cowling of the rotary wing aircraft.

6. The rotary wing aircraft of claim 1, wherein the at least one source of asymmetry comprises a deflectable flap.

7. The rotary wing aircraft of claim 1, further comprising an uncovered propeller drive shaft configured to create a Magnus effect upon rotation in main rotor downwash.

8. The rotary wing aircraft of claim 7, wherein the uncovered propeller drive shaft extends coupling- and bearing-free between the front section and the push propeller.

9. The rotary wing aircraft of claim 7, wherein the uncovered propeller drive shaft is a cylinder shaft or a conical shaft.

10. The rotary wing aircraft of claim 1, which is embodied as a compound helicopter, wherein the main rotor forms a single rotor plane.

* * * * *